United States Patent
Bergmark (10) Patent No.: US 6,707,212 B2
(45) Date of Patent: Mar. 16, 2004

(54) ELECTRICAL MACHINE

(76) Inventor: Gustaf Bergmark, Trumpetarbacken 19, S-611 57 Nykoping (SE)

(*) Notice: Subject to any disclaimer, the term of this patent is extended or adjusted under 35 U.S.C. 154(b) by 46 days.

(21) Appl. No.: 10/302,371

(22) Filed: Nov. 22, 2002

(65) Prior Publication Data

US 2003/0076003 A1 Apr. 24, 2003

Related U.S. Application Data

(62) Division of application No. 09/868,673, filed as application No. PCT/SE99/02447 on Dec. 21, 1999.

(30) Foreign Application Priority Data

Dec. 21, 1998 (SE) ................................................ 9804490

(51) Int. Cl.[7] ................................................. H02K 1/00
(52) U.S. Cl. ............... 310/181; 310/154.01; 310/154.02
(58) Field of Search ................................. 310/181, 152, 310/154.01, 154.02, 254, 258, 259, 261, 268, 216–218

(56) References Cited

U.S. PATENT DOCUMENTS

| | | | | |
|---|---|---|---|---|
| 3,775,684 A | * | 11/1973 | Hoodwin | 324/162 |
| 3,786,291 A | * | 1/1974 | Sidell | 310/162 |
| 3,947,711 A | * | 3/1976 | Presley et al. | 310/155 |
| 4,639,626 A | * | 1/1987 | McGee | 310/155 |
| 5,057,727 A | * | 10/1991 | Jones | 310/68 B |
| 5,191,255 A | * | 3/1993 | Kloosterhouse et al. | 310/156.38 |
| 5,786,645 A | * | 7/1998 | Obidniak | 310/68 R |
| 6,373,161 B1 | * | 4/2002 | Khalaf | 310/154.02 |

* cited by examiner

*Primary Examiner*—Dang Le
(74) *Attorney, Agent, or Firm*—Rolf Fasth; Fasth Law Offices

(57) ABSTRACT

The present invention relates to an electrical machine which has one or several stators (2) edified by one or several statorpackages (21) that consists of one or several statorsections (22). The core (23) of the statorpackage is arranged to cooperate with a coil (24) which winding axis (2) of the machine to obtain axially directed magnetic flux. Further, the machine comprises one or several rotordiscs (11) that are arranged on the rotary axis (2).

4 Claims, 12 Drawing Sheets

ELECTRICAL MACHINE

This application is a divisional of U.S. Ser. No. 09/868,673, filed Jun. 19, 2001; which claims priority from International Patent Application No. PCT/SE99/02447, filed Dec. 21, 1999; which claims priority from Swedish Application No. 9804490-2, filed Dec. 21, 1998.

TECHNICAL FIELD

The present invention relates to an electrical machine with axially directed magnetic flux.

DESCRIPTION OF THE BACKGROUND ART

Electrical machines with axially directed flux have been subjected to many constructional problems. In this type of machines, the flux propagates in three dimensions which causes big problems with flux leakage. Traditional electrical steel sheets are not convenient for flux in several dimensions. Further, the design of the winding has caused cooling problems. Available constructions within the area are complicated to manufacture. Known machines have problems with both vibrations and high sound level. Machines according to known technique furthermore have problem with high starting torque.

SUMMARY OF THE INVENTION

The present invention intend to solve the above mentioned problems. The object is to provide an electrical machine with axially directed flux with low flux leakage, low vibrations and low starting torque, which is easy to manufacture and useful in a number of different applications. The construction enables automatic manufacturing, which makes it easy and cheap to manufacture. The forces operating on the rotor have their point of attack near the periphery of the machine which result in a long torque arm and consequently high torque. As a result of this, the machine according to the present application have very large torque density. The construction also results in a low starting torque.

The invention according to the present application relates to an electrical machine comprising one or several stators edified by statorpackages, which consist of one or several statorsections. The core of the statorpackage is arranged to cooperate with a coil which winding axis is parallel to the rotary axis to obtain axially directed flux in the machine. Further, the machine comprises one or several rotors that are arranged on a rotary axis. The electrical machine according to the present application may in a preferred embodiment be provided with a ring-shaped statorwinding with large cross section area and small diameter which minimises the waste power and simplifies cooling. Large cross section area and consequently lots of ampere-turns results in high effect per weight and volume unit for the machine.

The stator is edified by statorpackages comprising one or several sections and one coil. The design result in a much shorter path for the magnetic flux compared to earlier known desings because the flux only have to round the cross sections area of the coil. Each statorsection is provided with poles that in a preferred embodiment are placed outside the rotor. The poles of the rotor conduct or block the flux through respective statorsection to obtain an alternating flux through the coil. With many rotorpoles, high frequency is obtained for the generated voltage alternately low rotation speed at motor operation. Each statorsection may be provided with several poles to obtain high frequency at low rotation speed and at the same time provide large fluxarea. The statorcore is made of laminated steel sheets with a statorframe of plastic material. Alternately, the statorcore may be made of compressed powder material.

The rotor is arranged to obtain periodically varying reluctance along its periphery. In a preferred embodiment, the whole rotor is made of magnetic material and the varying reluctance is obtained by providing the rotor with teeth. In this embodiment, the rotor is made of laminated steel sheets, alternately compressed powder material, with low reluctance and low eddy current losses. The rotor may be provided with one outer angled edge which define an envelope surface along its periphery.

In another embodiment, the rotor consist of one or several discs of a non-conducting shape-resistant material with high reluctance such as glass- or carbon fibre armed plastic material. On the surface of the rotordisc, rotorpoles made of material with low reluctance such as powder of metal or laminated steel sheets are mounted. The rotor may be provided with an outer angled edge which define an envelope surface along its periphery. In the latter embodiment, the rotorpoles are mounted on said envelope surface. Within the scope of the attached patent claims, the rotor may be designed in a number of different embodiments.

The rotors and adherent statorpackages of the machine are in a preferred embodiment mounted along the axis of the machine. A multiphase generator or motor is obtained by connecting several rotordiscs with adherent statorpackages on the same axis. To obtain phase difference between the phases the statorpackages may be mounted displaced relative to each other along the periphery. Alternately, the rotordiscs may be displaced relative to each other.

The statorpackages of the machine may be mounted along the periphery of the rotor in an alternative embodiment.

In an embodiment, to obtain large magnet surface the machine is provided with permanentmagnets placed near the envelope surface of the machine, consequently high magnetic flux is obtained. Permanentmagnets are mounted on each statorpole near the envelope surface alternately on the poles of the rotor. The design permits a small distance between the airgap between rotor and stator and the magnets, which result in very low flux leakage. The permanentmagnets are preferably arranged axially directed. The permanentmagnets in the stator are preferably directed to obtain alternately directed flux through the sections of the stator.

The rotors and adherent statorpackages of the machine are in a preferred embodiment mounted along the axis of the machine. The machine may be provided with a device, which separates rotor from adherent statorpackage axially. This will reduce the magnetic brake action when the machine starts as a generator.

The machine may also act as a linear motor or generator. In an alternative embodiment, the machine acts as a linear motor with straight rotor arranged to obtain periodically varying reluctance along its length.

Manufacturing may be automatic to a great extent. In an embodiment, the ring-shaped prefabricated winding is mounted in the stator, subsequently the rotor is mounted as a lid over the winding. Several of these packages may be mounted together and connected to the same axis. Manufacturing will save material since the high torque density results in small volume. The amount of both copper and iron will be reduced correspondingly. The manufacture will not result in waste, which traditional manufacturing with punched stator laminations results in.

Above, a number of examples for applications are mentioned. Generator for car: the invention is smaller, lighter and obtain better charging at low speed than generators according to known technique. Car industry chases weight and the solution provided by the invention will result in a considerably weight loss for the generator. Motor and generator in a vehicle: the invention permits small, light motors that may be integrated in the design of the wheel. High efficiency result in long battery time. Braking result in large brake torque which reduces the need of traditional brakes and also result in effective charging of the battery. High starting torque reduces the need of gearbox. Motor and generator in aeroplanes and satellites: the invention saves both weight and volume, which is very important in these applications. Gearboxes may be eliminated which increases efficiency. The invention may directly replace electrical motors of today, if fed with high frequency (<1 kHz). Reluctance motor for domestic apparatus etc: the invention permits small cheap motors that may be mass produced with small consumption of raw material in an automatic manufacturing process with a minimum of waste. Robots: the invention permits exact movements for robots as a consequence of many poles and synchronous operation. In case of power failure, the robot will stop as a consequence of the high brake torque. The motor may be integrated in the joints of the robot.

The high torque density of the invention is close to the one of the hydraulic motor. The invention may, in many cases, replace these especially if the compressor is electrically operated and the distance is long between the hydraulic pump and the motor.

A method for manufacturing an embodiment of the machine according to the present invention comprises a mould with a lower and an upper part. In the lower part of the mould statorpackages are mounted, or, when manufacturing rotors, rotorpoles. These are mounted in special fixings. Armour may be mounted in the lower part of the mould when desired. The upper part of the mould is fixed in place towards the lower part, subsequently a convenient material, such as plastic material, is pressed into the mould through ducts in the mould.

BRIEF DESCRIPTION OF THE DRAWINGS

FIGS. 5–10a and 10b show different alternative embodiments of statorsections 22 according to FIG. 4.

DETAILED DESCRIPTION OF PREFERRED EMBODIMENTS OF THE INVENTION

FIG. 1 shows different embodiments of the rotor 1. FIG. 1a shows a rotor 1 consisting of a rotordisc 11. FIG. 1b shows a rotordisc 11 which periphery is provided with a first outer angled edge 12. FIG. 1c shows a rotordisc 11 provided with an inner angled edge 13 extending parallel to the outer angled edge 12 and placed at a distance from the same. FIG. 1d shows a rotordisc 11 which periphery is provided with a ring-shaped notch 14, which is closed towards the axis and open towards the periphery. FIG. 1e shows a rotordisc 11 provided with an angled edge which end 15 is angled back towards the axis and extending parallel to the plane of the disc defining a notch which is open towards the axis (2) and closed towards the periphery. FIG. 1f shows a rotordisc 11 provided with a further notch 16, which is open towards the axis and closed towards the periphery. FIG. 1g shows two rotordiscs 11 arranged at a distance from each other, axially connected and provided with angled edges 17 directed towards each other. FIG. 1h shows a rotordisc 11 provided with a further angled edge 18 reversed to the first in relative to the plane of the disc.

FIGS. 2a–d shows different embodiments of statorpackages 21. A coil 24 is arranged around a core 23, which consist of one or several statorsections 22. The statorsections 22 may be provided with permanentmagnets 30 that may be arranged to generate reverse directed flux through each statorsection respectively, as shown with narrows in FIG. 2b, or to generate flux in the same direction through the sections 22 (not shown).

Figure 1A:
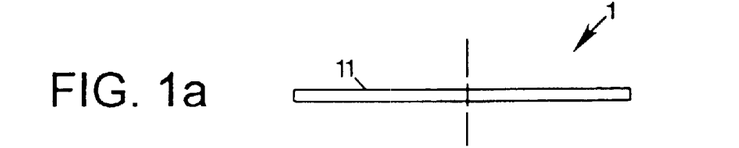
FIG. 1 shows different embodiments of the rotor 1.
Figure 1B:
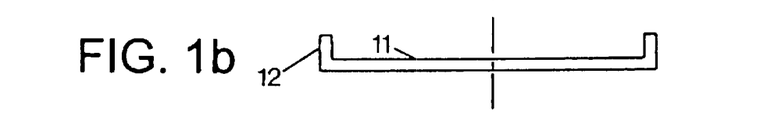
Figure 1C:
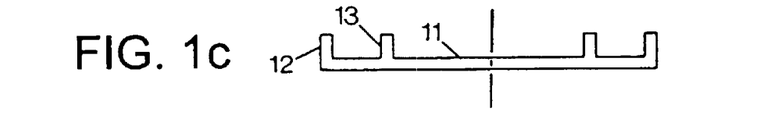
Figure 1D:
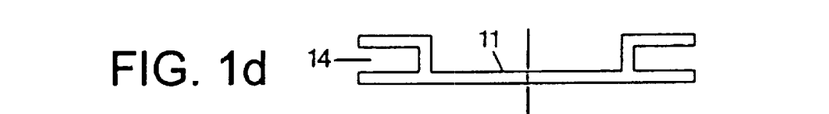
Figure 1E:
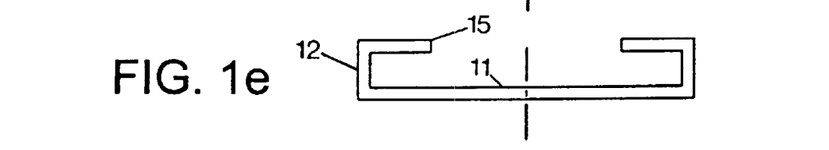
Figure 1F:
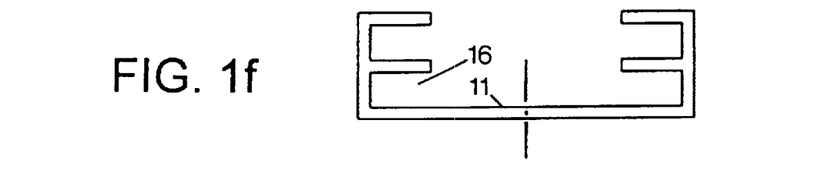
Figure 1G:
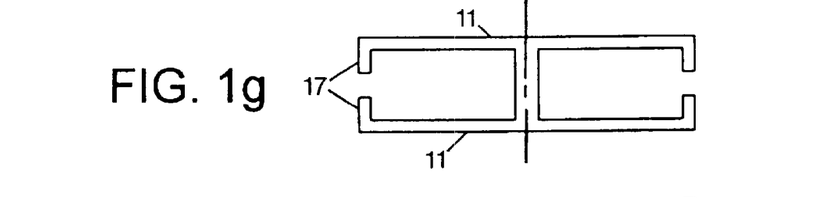
Figure 1H:
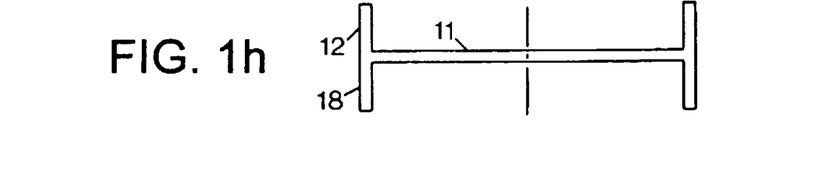
Figure 2A:
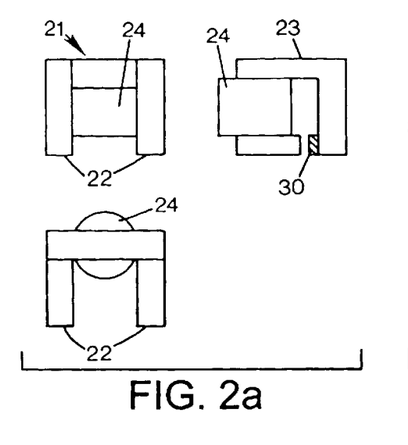
FIG. 2 shows different embodiments of statorpackage 21.
Figure 2B:
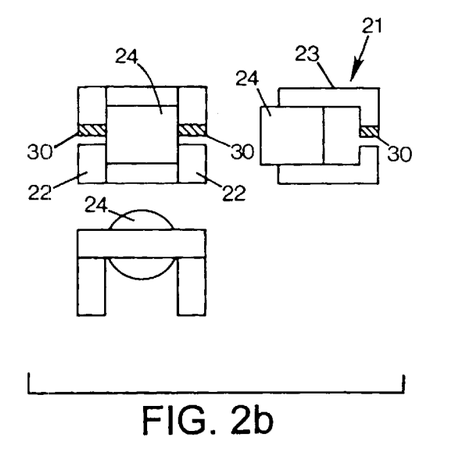
Figure 2C:
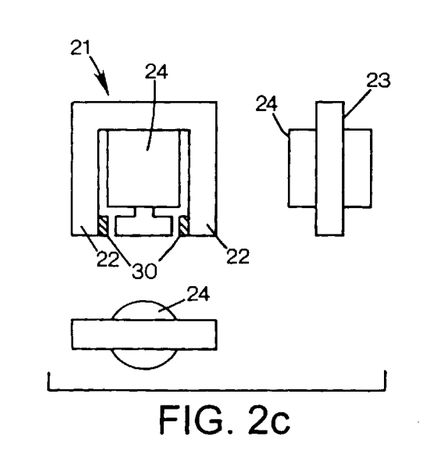
Figure 2D:
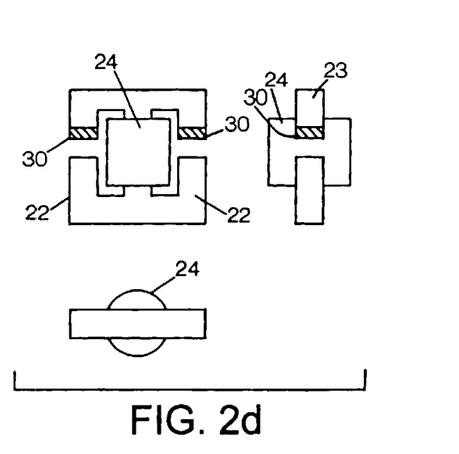
Figure 3A:
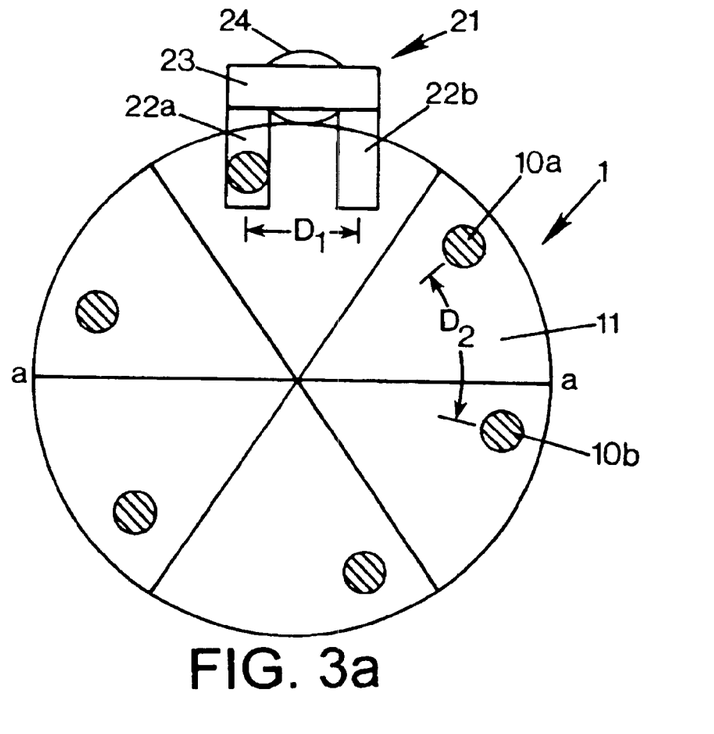
FIG. 3 shows a statorsection 22 mounted along the periphery of the rotor 1.
Figure 3B:
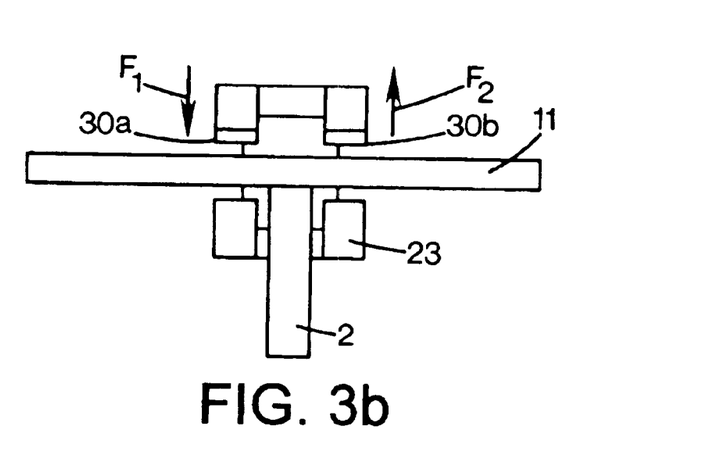

FIG. 3 shows a statorpackage 21 consisting of two statorsections 22a and b provided with permanentmagnets 30, and a coil 24 mounted along the periphery of the rotor 1. In this embodiment the rotor consist of one rotordisc 11 mounted on the axis 2 of the machine. One statorpackage 21 is shown in the figure but an optional number may be placed along the periphery of the rotor 1. A statorpackage directed according to the line a—a will generate a voltage 90° phase displacement to the shown statorpackage 21.

Figure 4:
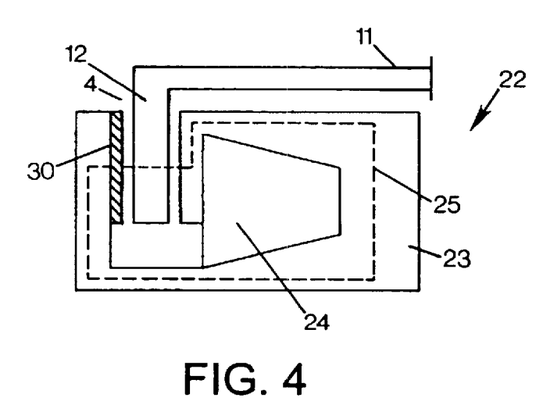
FIG. 4 shows a cross section of an embodiment of a statorsection 22.

FIG. 4 shows a cross section for an embodiment of a statorpackage 21. The core 23 is provided with an axially oriented permanentmagnet 30 and a coil 24. The rotor 1 consist of a rotordisc 11 with an angled edge 12 which together with the core 23 defines double airgaps 4. The line 25 shows the flux path.

Figure 5:
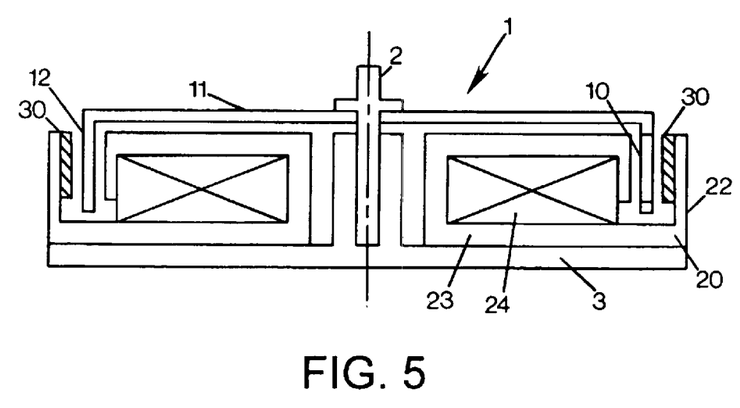

FIG. 5 shows an alternative embodiment of the machine. Rotor 1 and stator 20 are mounted along the axis 2 of the machine. The angled edge 12 of the rotor is provided with rotorpoles 10 that cooperates with permanentmagnets 30 of the stator 20. The stator 20, which is arranged on foundation 3, consist of one statorpackage 21 with a coil and one or several statorsections defining the core 23. The geometry shown results in very high torque density. Each statorsection is provided with desired number of poles with the same pole pitch as the poles of the rotor.

Figure 6:
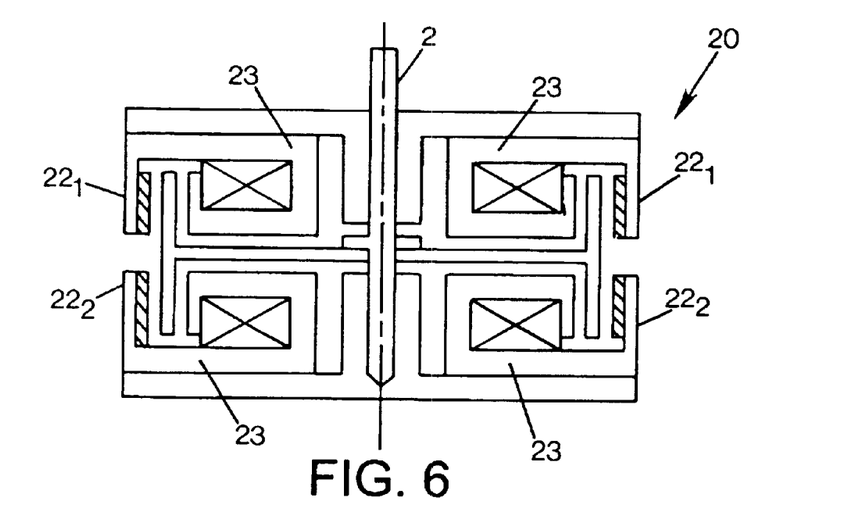

FIG. 6 shows a two-phase machine with rotor 1 and stator 20 arranged at the axis 2 of the machine. The stator 20 consist of two statorpackages 221 and 222 respectively. Each statorpackage 22 comprises one coil 24 and one or several statorsections 22 defining the core 23 provided with permanentmagnets 30. The machine may operate as motor or generator. When acting as motor, the applied voltage over respective coil 24 will eliminate the flux from one of statorsections 22 and intensify the flux from the other. When acting as motor, the machine works as a stepmotor with 4 steps per period of supplied voltage. The rotorpoles for statorpackage 221 and 222 are relative to each other phase displaced half the angle between two rotorpoles. When acting as generator two alternating voltages phase displaced 90 relative to each other.

Figure 7:
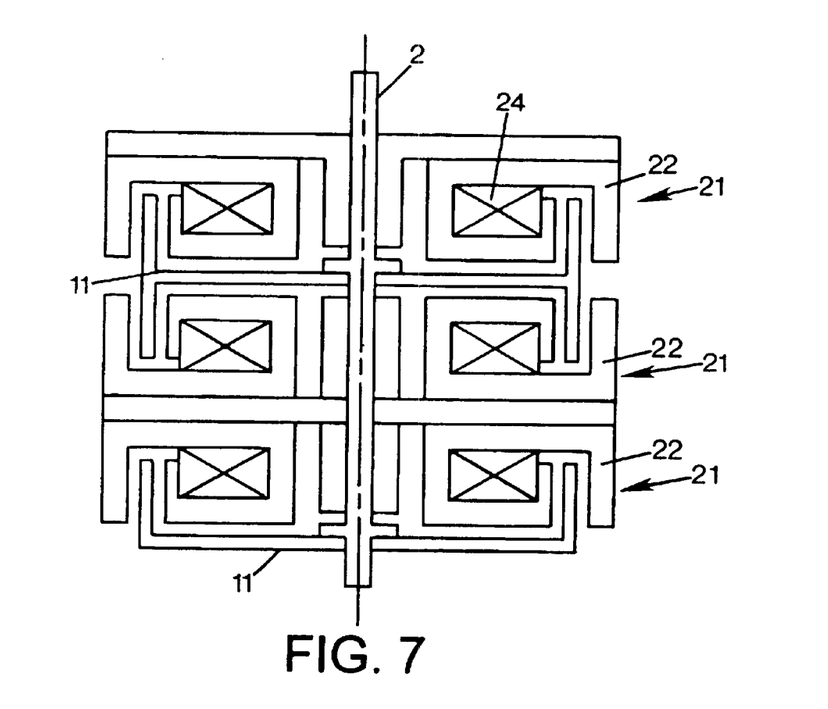

FIG. 7 shows a three phase motor without permanent-magnets. The permanentmagnets may be excluded when acting as motor only. The machine will act as a strict reluctance motor resulting in cheap and easy manufacturing. The rotor 1, comprising several rotordiscs 11, with adherent three statorpackages 21 with three phase coils 24 and one or several statorsections 22 are mounted at the axis 2 of the machine. The statorpackages 21 are relative to each other displaced one third of the pole pitch. The motor will not differ to changes of polarity at the supply voltage. A Y-connected three-phase motor may be supplied directly from the three phase net or by frequency converter and diodes.

Figure 8:
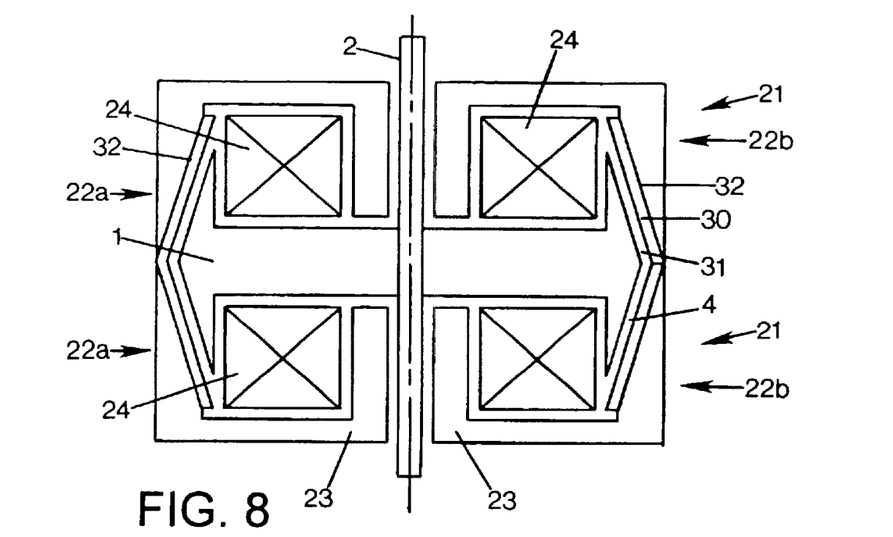
Figure 9:
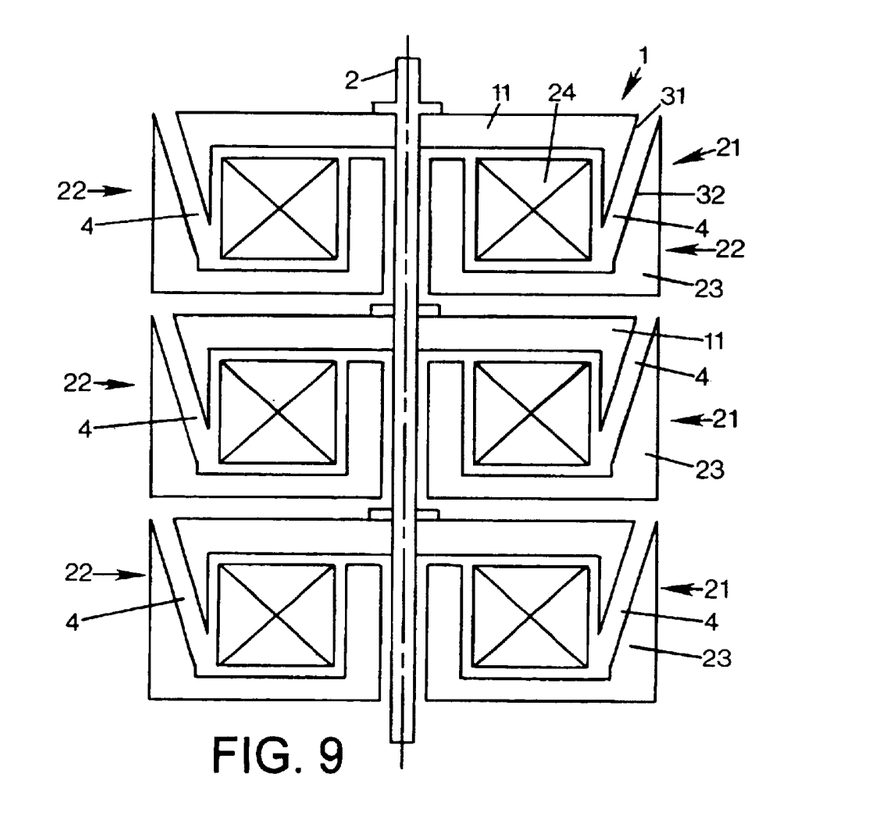

FIG. 8 shows a section of a two phase motor comprising two statorpackages 21 consisting of two coils 24 arranged around the axis 2 of the machine. The rotor 1 is provided with a bevelling 31. Each statorpackage 21 consist of two statorsections, 22a and 22b respectively, defining respective core 23, which core is provided with a bevelling 32 meant to, in cooperation with the bevelling 31 of the rotor, define airgap 4. The poleteeth in statorsection 22a and 22b respectively are, in position to the rotor, displaced relative to each other with half the distance between two rotorpoles. This result in that when the poles of the rotor conduct the flux through statorsection 22a will, at the same time, the flux through statorsection 22b be blocked. The permanentmagnets are directed to obtain opposite flux directions in section 22a and section 22b respectively. The second phase coil have a statorpackage 21 identical but displaced ¼ of the angle between two rotorpoles. The permanentmagnets 30 are substantially axially directed. FIG. 9 shows a section of a three-phase motor consisting of statorpackages 21 with three phase coils 24 and three rotordiscs 11 arranged around the axis 2 of the machine. Each statorpackage 21 include one statorsection 22 with the same number of teeth as the number of poles in the rotor. Alternately, each statorpackage 21 may include several statorsections 22. In the latter alternative the statorpackage 21 have less or equal number of poles as the rotor 1. The core 23 is provided with a bevelling 32 meant to, in cooperation with the bevelling 31 of the rotor, define airgap 4. The statorpackages 21 are relative to each other displaced ⅓ of the angle between two rotorpoles. Alternately, this displacement is obtained by turning respective rotordisc relative to the others. No permanentmagnets are used in this alternative, instead the motor acts as a strict reluctance motor.

Figure 10A:
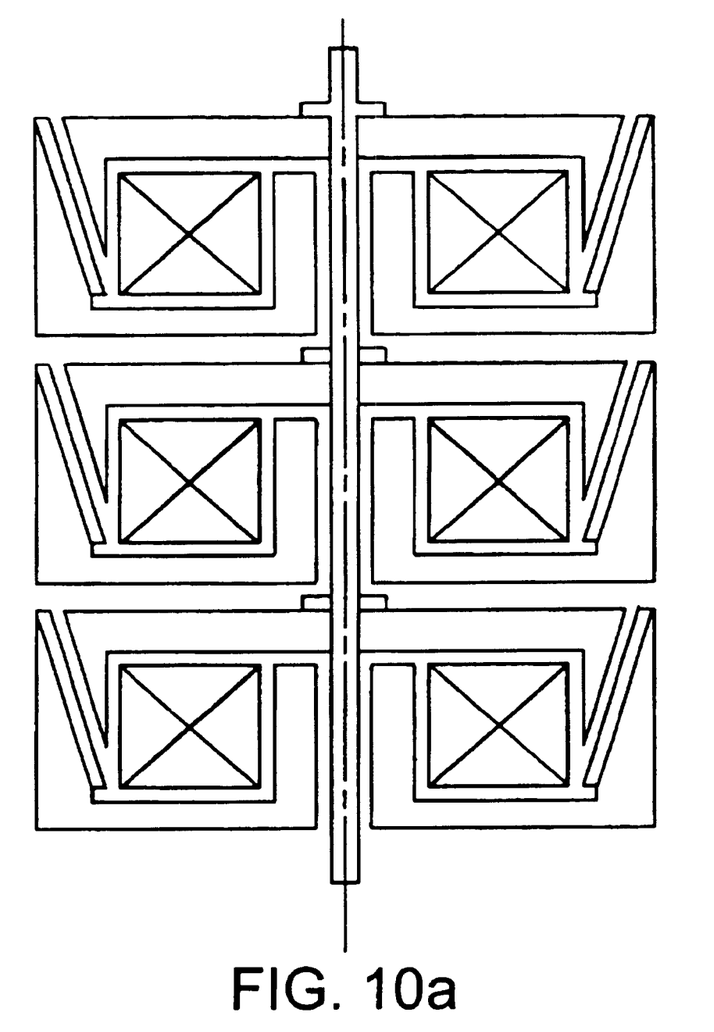
Figure 10B:
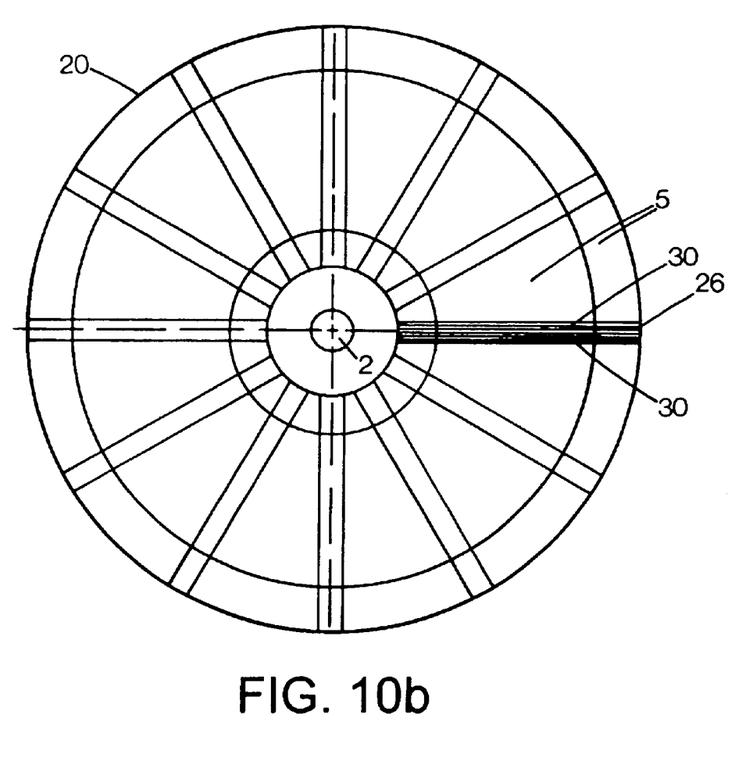

FIGS. 10a–b shows a section of a threephase motor consisting of three phase coils 24 and three statorpackages 21, each provided with a rotordisc 11 which is stiff mounted on the axis 2 of the machine. The core 23 is provided with a bevelling 32 meant to in cooperation with the bevelling 32 of the rotor define airgap 4. Each statorpackage includes one statorsection 22 with the same number of teeth and permanentmagnets 30 as the number of poles in the rotor 1. With only one statorsection 22 maximum of statorpoles may be contained in a given volume. In this case, the flux will have one direction only, but instead it will be twice the size whereby the amplitude of the flux and the generated voltage will be the same. Alternately, statorpackages 21 may consist of several statorsections 22. The number of teeth and per-manentmagnets 30 on statorpackage 21 may be less or equal to the number of poles in the rotor 1. The flux from all permanentmagnets 30 belonging to the same statorpackage 21 will cooperate. The three statorpackages are, in relative to each other, displaced with ⅓ of the angle between two rotorpoles. In an alternative embodiment may this displacement be obtained by turning respective rotordisc 11 in relation to the others. FIG. 10b shows the cross section A—A for an embodiment of the stator 20. The stator 20 consist of laminated steel sheets enclosed by a statorframe 5 of plastic material. Statorpoles 26 are provided with perma-nentmagnets 30.

Figure 11:
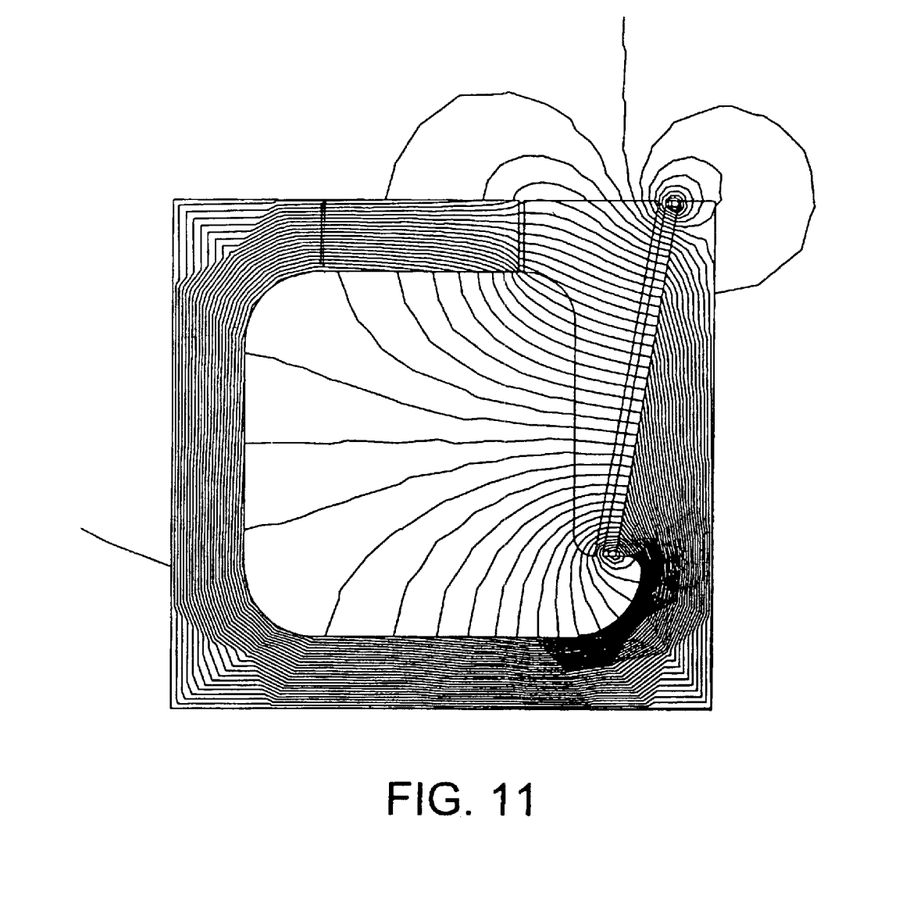
FIG. 11 shows a FEM calculation picture for the flux in a core 23 provided with a permanentmagnet 30.

FIG. 11 shows a FEM calculation picture for the flux in a core 23 provided with a permanentmagnet 30. The rotor-tooth 19 have, in respect of calculations, been replaced by air. The picture shows that very low flux leakage is obtained by this design.

Figure 12A:
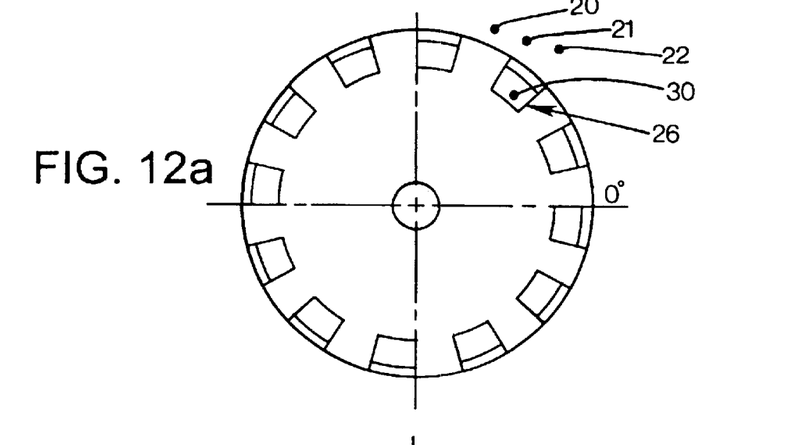
FIG. 12 shows an embodiment of the machine where the rotor is provided with teeth 19 and the stator 20 is provided with permanentmagnets 30.
Figure 12B:
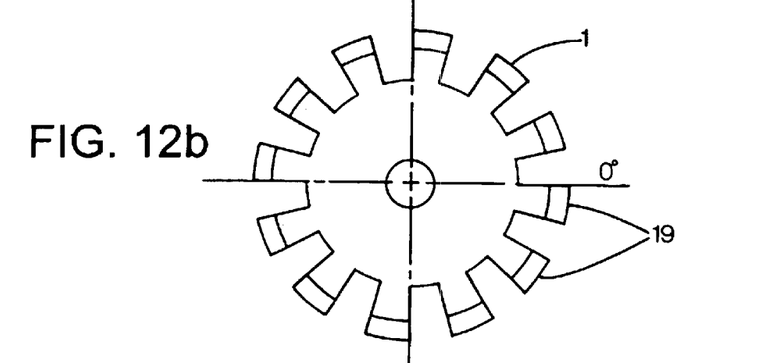
Figure 12C:
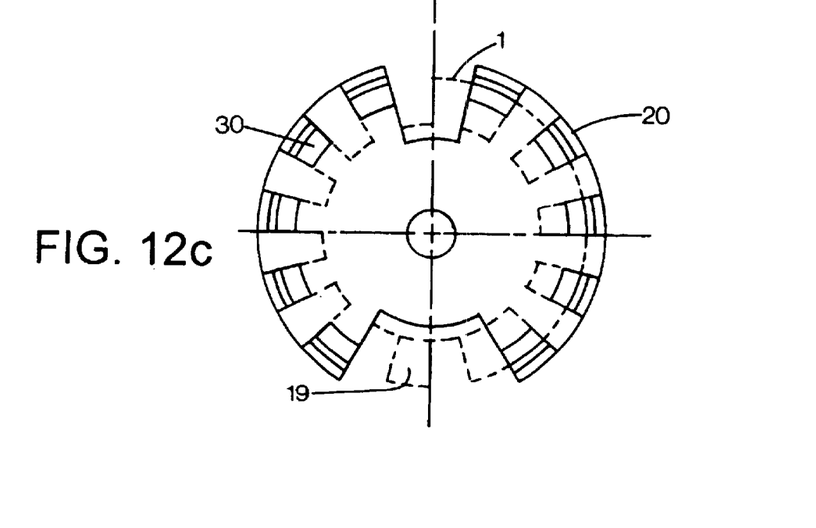

FIG. 12 shows an embodiment of the machine where the rotor 1 is provided with teeth 19 and the stator 20 with statorpoles 26 provided with permanentmagnets 30. According to FIG. 12a, each statorpackage 21 includes one statorsection 22 with the same number of teeth as the number of poles in rotor 1. According to FIG. 12c each statorpackage may alternately include several statorsections 22. In the latter alternative statorpackage 21 may have less poles than the rotor, which is shown in the figure.

Figure 13:
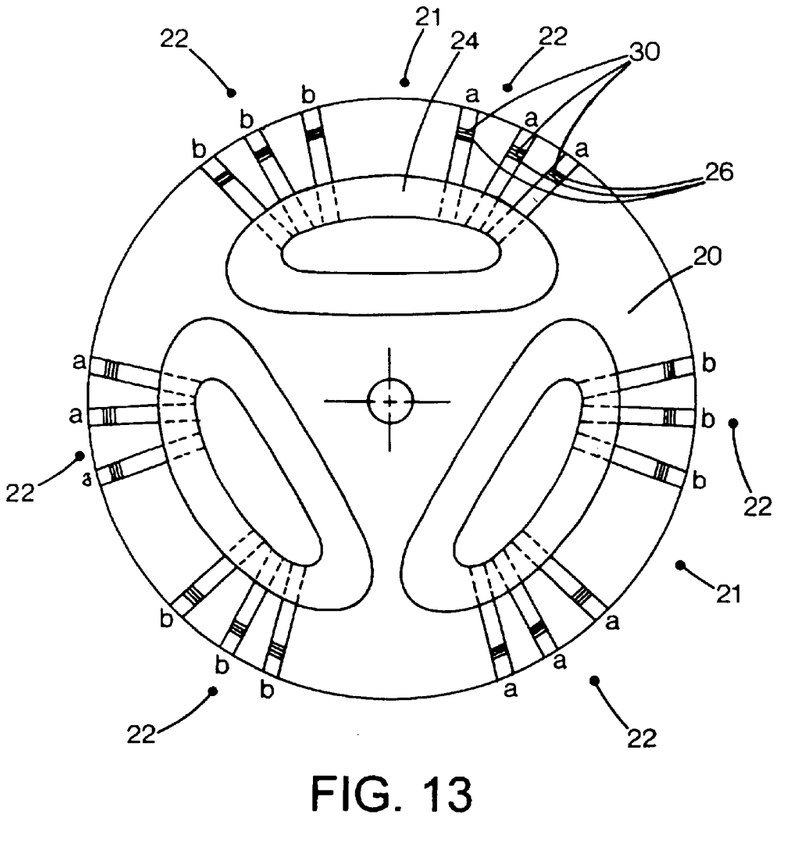
FIG. 13 shows a further embodiment of the machine.

FIG. 13 shows a further embodiment of the machine. The machine is provided with three statorpackages 21. Each of these statorpackages 21 consist of two statorsections 22a and 22b respectively. The rotor 1 is of the type described in FIG. 1b and the statorpackages 21 of the type described in FIG. 3. This embodiment admit lot of poles and provides a disc-shaped electrical machine. The figure shows only six statorpoles 26 per statorpackage 21 but the number may be increased to obtain more flux.

I. the two statorsections 22a will alternately conduct flux through its winding because the permanentmagnets 30 on statorpoles a are directed reverse to the permanentmagnets on statorpoles b at the same time as a and b-poles respectively are displaced half the distance between two rotorpoles to make the rotor block flux from one section and, at the same time, conduct flux from the other. The direction of the flux will vary during one period. The three statorpackages are displaced in relation to the rotor to obtain a three phase alternating voltage generated when the rotor rotates.

II. the two sections a and b of each statorpackage respectively cooperates to make all six statorpoles belonging to one statorpackage conduct flux at the same time because the permanentmagnets for sections a and b and the distance between the statorpoles for the sections is an equal split of the rotor teeth. The direction of the flux will not change in this alternative, while the amplitude varies between zero and a maximum.

III. the permanentmagnets may instead be mounted on the rotor. These are turned to the same direction to cooperate. If the permanentmagnets are mounted on the rotor, the stator-packages will be designed according to II above.

IV. in an alternative embodiment where the machine is totally without permanentmagnets the function will be according to II and III above.

Figure 14:
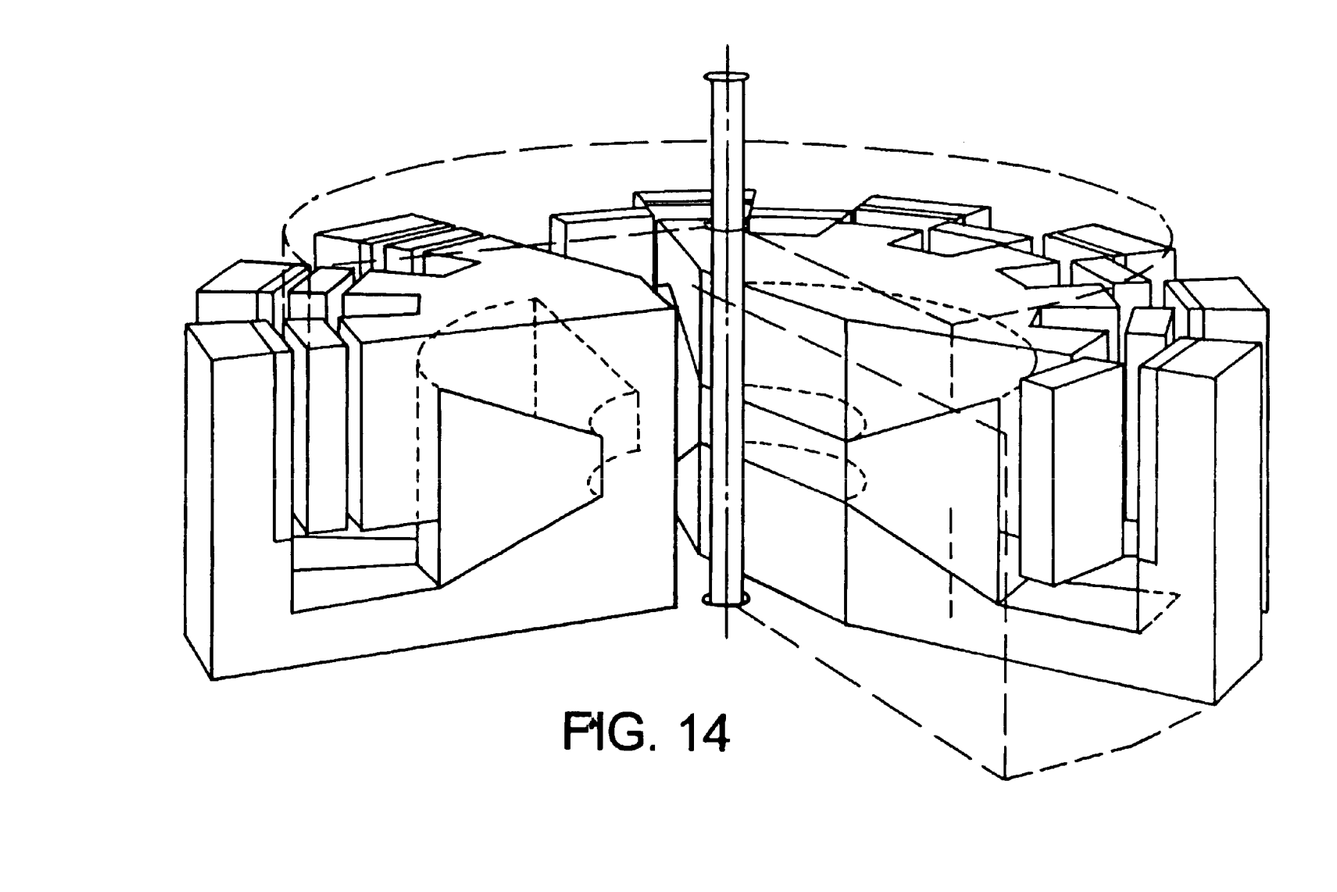
FIG. 14 shows a perspective drawing over a section of rotor and statorpackage comprising two statorsections that in position to the rotor are displaced relative to each other.

FIG. 14 shows a perspective drawing showing a section of rotor and statorpackages consisting of two statorsections that are, in position to the poles of the rotor, displaced relative to each other.

What is claimed is:
1. A method of using an electrical machine, comprising:
providing an electrical machine with a rotor (1) arranged on a rotary axle (2), a stator package (21) having a first stator section (22a) and a second stator section (22b) connected by a core (23) arranged to cooperate with a coil (24), the first stator section (22a) being spaced a distance (D1) from the second stator section (22b), a first permanent magnet (30a) being directed in a fist flux direction and a second permanent magnet (30b) directed in a second flux direction, the first magnet (30a) being attached to the first stator section (22a) and the second magnet (30b) being attached to the second stator section (22a), a first rotor pole (10a) and a second rotor pole 10b disposed on a rotor (11), the first rotor pole (10a) being spaced a distance (D2) from the second rotor pole (10b), the distance (D2) being different from the distance (D1);

while positioning the first rotor pole (10a) directly below and aligned with the first stator section (22a) positioning the second rotor pole (10b) away from the second stator section (22b); and while permitting a first magnetic flux from the first magnet (30a) through the first rotor pole (10a) blocking any magnetic flux from the second magnet (30b) by the rotor disc (11).

2. The method according to claim 1 wherein the method further comprises aligning the rotary axis (2) so that is parallel to the first magnetic flux.

3. The method according to claim 1 wherein the method further comprises providing the first flux direction with a direction that is opposite a direction of the second flux direction.

4. The method according to claim 1 wherein the method further comprises rotating the rotor disc 11 about the rotary axis 2.

* * * * *